3,129,264
ALKYLATION OF AROMATIC COMPOUNDS
Mack W. Hunt, Ponca City, Okla., assignor to Continental Oil Company, Ponca City, Okla., a corporation of Delaware
No Drawing. Filed Dec. 15, 1960, Ser. No. 75,908
12 Claims. (Cl. 260—671)

This invention relates to a method for the alkylation of aromatic compounds with aluminum alkoxides. In one aspect, the invention relates to the alkylation of aromatic hydrocarbons such as benzene with aluminum alkoxides in the presence of a Friedel-Crafts type catalyst.

This application is a continuation-in-part of the copending application Serial No. 71,445, filed November 25, 1960.

It is an object of this invention to provide an improved process for the alkylation of aromatic compounds.

It is another object of this invention to provide a process for the selective alkylation of aromatic hydrocarbons in the presence of a Friedel-Crafts catalyst.

Still another object of this invention is to provide an improved process for the alkylation of aromatic hydrocarbons in the presence of a Friedel-Crafts catalyst at more elevated reaction temperatures.

These and other objects of the invention will become more readily apparent from the following detailed description and discussion.

The foregoing objects are realized broadly by reacting an alkylatable aromatic compound with an aluminum alkoxide in the presence of an alkylation catalyst under alkylation reaction conditions and recovering alkylated aromatic compound.

In one aspect of the invention, the aluminum alkoxide comprises compounds obtained by reacting a low molecular weight aluminum alkyl with a low molecular weight mono-1-olefin to form an aluminum alkyl growth product and thereafter reacting said growth product to form the alkoxides. In another aspect, the aluminum alkoxide comprises compounds obtained by reacting an alcohol with metallic aluminum. This method yields an aluminum alkoxide and hydrogen, and one may obtain a pure aluminum alkoxide or mixtures thereof, depending on the starting alcohols.

Illustrative of the reactions which occur in carrying out the method of this invention are the following:

(1) $3ArH + Al(OR)_3 + AlCl_3 \longrightarrow 3ArR + 3HCl + Al_2O_3$ (2) $3ArH + Al(OR)_3 \xrightarrow{BF_3} 3ArR + Al(OH)_3$ where
Ar = aromatic
R = alkane The method of this invention is applicable broadly to aluminum alkoxides and aluminum alkoxide mixtures. In particular, however, the invention is directed to aluminum alkoxides which are obtained by the oxidation of complex aluminum alkyls. In this method for the preparation of alkoxides, an aluminum alkyl, such as triethylaluminum, is reacted with a low molecular weight olefin, such as ethylene, to form a "growth" product, said product comprising trialkylaluminum compounds in which the alkyl groups vary widely in molecular weight. The growth reaction can be illustrated equationwise as follows:

(3) 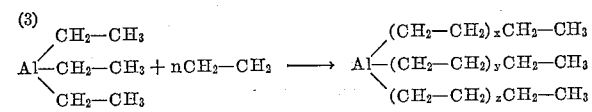

wherein $x$, $y$, and $z$ represent integers ranging from 0 to about 14 and $x+y+z=n$. The growth reaction is carried out by passing ethylene through triethylaluminum, preferably in the presence of a diluent under a wide variety of reaction conditions, for example, 65 to 155° C. and 200 to 5,000 p.s.i.g., preferably 90 to 120° C. and 1,000 to 3,500 p.s.i.g. Although triethylaluminum is the preferred reactant, other low molecular weight aluminum alkyls, such as tripropylaluminum, tributylaluminum, triisobutylaluminum, diethylaluminum hydride, ethylaluminum dihydride, etc., can be employed and other low molecular weight aliphatic mono-1 olefins, such as propylene, butene, and the like can be substituted in lieu of ethylene.

It has been found that the growth reaction provides a statistical distribution of alkyl chain lengths characterized by the Poisson relationship, which can be expressed as follows:

$$P(n) = \frac{m^n e^{-m}}{n!}$$

wherein $P_{(n)}$ represents the probability that a certain hydrocarbon radical will be formed by $n$ additions of ethylene to the aluminum-ethyl bond originally present and $m$ is the mean number additions of ethylene per growing chain. An example of the type of distribution which is obtained in the growth reaction is presented in the following table:

TABLE

| Alkyl group: | Weight percent |
|---|---|
| $C_2$ | 0.04 |
| $C_4$ | 0.23 |
| $C_6$ | 3.37 |
| $C_8$ | 11.79 |
| $C_{10}$ | 20.42 |
| $C_{12}$ | 22.63 |
| $C_{14}$ | 18.20 |
| $C_{16}$ | 11.61 |
| $C_{18}$ | 6.21 |
| $C_{20}$ | 3.47 |
| $C_{22}$ | 1.25 |
| $C_{24}$ | 0.49 |
| $C_{26}$ | 0.18 |
| $C_{28}$ | 0.05 |

The product of the growth reaction is reacted with oxygen (air) usually at a temperature from about 20 to about 100° C. and a pressure from about 10 to 60 p.s.i.g. whereby the alkyl groups are converted to alkoxides. Either all or any portion of these alkoxides can be employed in the alkylation method of this invention.

The aromatic compounds which are employed in the alkylation process are broadly selected from those aromatic compounds which are known to be alkylatable. Preferably, the alkylatable compound is an aromatic hydrocarbon, for example, benzene, toluene, xylenes, ethylbenzenes, ethyltoluenes, cymene, cumene, n-propylbenzene, isopropylbenzene, naphthalene, and alkyl naphthalenes, for example, methyl naphthalenes, dimethyl napthalenes, and trimethyl napthalenes, diphenyl, alkyl diphenyls, anthracene, alkyl anthracenes, phenanthrenes, and the like. In addition other alkylatable aromatic compounds can be employed, including the phenol and hydroxy phenols, naphthols, hydroxy substituted phenanthrene derivatives, amino-substituted benzenes, napthalenes, and phenanthrenes, nitro-substituted aromatic hydrocarbons, carbosulfo-, and cyano-derivatives of both mono-nuclear and polynuclear aromatic hydrocarbons, and the like. The only requisite of the aromatic compound is that it be alkylatable, that is, that the aromtic compound contain replaceable hydrogen atom. Typical examples of the foregoing aromatic compounds include phenol, hydroquinone, resorcinol, pyrogallol, phloroglucinol, catechol, alpha and beta-naphthols, benzoic acid, mono-chloro, mono bromobenzene, the dihalogen substituted benzenes and napthalenes, such as o-dichlorobenzene; thiophene; the aromatic alcohols, such as, benzyl alcohol; aromatic compounds containing various nuclear substituents such as phenylnitrile, benzene, toluene, ethylenzene, ethyltoluene, cumene and a host of other compounds containing one or more nuclear substituents.

In carrying out the invention, the alkylatable aromatic compound and aluminum alkoxide or alkoxides are contacted with a conventional alkylation catalyst under suitable reaction conditions and for a period of time sufficient to effect the alkylation reaction. Any of the conventional alkylation catalyst can be employed in this process. These catalysts generally are included under the heading of Friedel-Crafts catalysts and include metal halides of groups II, III, IV, and V of the periodic table, such as, for example, zinc chloride, boron fluoride, boron chloride, boron bromide, aluminum chloride, aluminum bromide, aluminum iodide, gallium chloride, scandium chloride, titanium tetrachloride, titanium tetrabromide, antimony trichloride, bismuth trichloride, and the like. Other well known alkylation catalysts include compounds such as ferric chloride, hydrogen fluoride, sulfuric acid, sulfonic acids, and the like. In addition, the alkylation catalysts include admixtures of compounds such as, for example, hydrogen fluoride and boron trifluoride. Many of the alkylation catalysts form complexes with hydrocarbons present in the alkylation system and more usually with one of the alkylation reactants. Of the catalysts set forth above, it is generally preferred to employ aluminum chloride in the method of this invention. Depending on the particular catalyst employed, the amount required is within the range ordinarily employed in the art for alkylation of aromatic compounds with other alkylating agents.

The alkylation reaction is carried out over a wide range of temperatures which can vary from as low as about −25° C. to as high as about 200° C. The particular temperature employed in a given reaction will, of course, depend on the alkylation reactants and also on the catalyst which is present in the reaction system. It has been found unexpectedly that employing the aluminum alkoxide or alkoxides as the alkylating agent makes it possible to effect the alkylation reaction at temperatures higher than those which are ordinarily used. For example, the alkylation of an aromatic compound such as benzene with a low molecular weight olefin is ordinarily effected at low temperatures, usually less than about 25° C. The same aromatic compounds can be effectively alkylated with aluminum alkoxides at substantially higher temperatures, for example, up to 70 to 80° C. or higher. It has further been found that the use of more elevated temperatures provides an unexpected effect on the selectivity on the alkylation reaction. Thus in the reaction of benzene with aluminum alkoxides, it has been found that, if the alkylation catalyst is added to the reaction system at different temperatures, the type of product obtained can be selectively controlled. In the alkylation of benzene with aluminum isopropoxide, the reaction product includes mono-, di-, and trisubstituted benzene compounds. It has been found that the formation of the mono-substituted product is substantially increased as the temperature of catalyst addition is increased. Thus, in one series of runs, increasing the temperature at which the catalyst was added to the system from about 5° to about 75° reduced the yield of di- and trisubstituted benzenes from about 12 percent to 2½ percent.

The time required to effect alkylation varies widely depending on the reactants, the catalyst, and the other alkylation conditions, particularly the alkylation temperature. The reaction can be carried out over time periods varying as low as 5 minutes to as high as 10 hours or higher, preferably from about one to about 4 hours. The reaction is usually carried out at atmospheric pressure; however, when it is desired to use more elevated temperatures, it may be necessary in some instances, depending on the boiling points of the reactants, to employ pressures above atmospheric. Usually it is desirable to carry out alkylation in the presence of an excess of the alkylatable aromatic compound, that is, between about 2 and about 15 moles of said compound per mole of aluminum alkoxide. Preferably, the alkylatable aromatic compound is present in the reaction system in a mole ratio of between about 5 and about 10.

After alkylation, the alkylation product is hydrolyzed by contact with a conventional hydrolyzing agent, for example, a mineral acid, such as hydrochloric acid or sulfuric acid, water, steam, or various basis, such as sodium hydroxide, potassium hydroxide, and the like. The hydrolysis reaction is effective for breaking the complex of reaction product and catalyst which is ordinarily formed in the alkylation reaction. Hydrolysis can be carried out over a wide range of temperature, for example, between about 0 and 125° C., with the hydrolyzing agent being employed, usually in amounts sufficient to provide an excess above stoichiometric based on the alkylation reaction product from about 2 to about 200 percent. The particular hydrolyzing agent which is used will vary, depending on the reaction products and the particular alkylation catalyst employed. Usually water is preferred as the hydrolyzing agent. However other agents are also used; for example, when employing aluminum chloride catalyst, hydrochloric acid is a suitable hydrolyzing agent. In many instances, it may be desirable to employ a hydrolyzing agent which is substantially inert to the alkylation catalyst.

Following hydrolysis, the reaction product is separated from the hydrolyzing agent and catalyst components and resolved into individual product components as desired, usually by distillation.

The following examples are presented in illustration of the invention:

Example 1

A suitable flask was equipped with a mechanical stirrer, thermometer, solid addition tube and condenser. To this flask were charged 400 parts of benzene and 82 parts of aluminum isobutoxide. The flask was cooled in an ice bath. One hundred parts of aluminum chloride were added slowly, maintaining the temperature between 3° and 7° C. After poststirring for about one hour, the mixture was heated to reflux for several hours. The reaction mixture was then poured on cracked ice and the benzene layer removed and dried with anhydrous calcium sulfate. The monobutylbenzene was removed by distillation. The major portion boiled between 165° and 175° C. and amounted to 65.4 parts. This corresponds to a yield of 53.5 percent based on the aluminum alkoxide. In addition, there were 17.8 parts of higher boiling di- and tributylbenzenes. This would raise the over-all yield to approximately 65 percent based on the aluminum alkoxide.

Example 2

The same procedure was used as in Example No. 1, except that aluminum isopropoxide was used as the alkylating agent. The following components were used:

| | Parts |
|---|---|
| Aluminum isopropoxide | 25 |
| Benzene | 300 |
| Aluminum chloride | 25 |

The yield of monopropylbenzene was 19.2 grams (43 percent). An additional 12 percent yield was accounted for by the formation of di- and tripropylbenzenes. The yields were based upon the aluminum isopropoxide.

Example 3

The same procedure as Example No. 1 was used, except that boron trifluoride was used as the catalyst. The following materials were used:

| | Parts |
|---|---|
| Aluminum isopropoxide | 25.0 |
| Benzene | 300.0 |
| Boron trifluoride diethyl etherate | 21.7 |

This procedure yielded 47 percent monopropylbenzene and approximately 14 percent of the di- and tripropyl derivatives.

*Example 4*

The same procedure was used as outlined in Example No. 1, except that ozidized aluminum alkyl growth product was used. This growth product was prepared by reacting ethylene at 120° C. and 1,500 p.s.i.g. for a period of time sufficient to obtain a growth product having an "$m$" [1] value of 4.1. The growth product was blown with dry air at 30° C. for a period of 18 hours to obtain the oxidized growth product. The following materials were used for this preparation:

| | Parts |
|---|---|
| Oxidized growth product ("$m$"=4.1) | 63 |
| Benzene | 300 |
| Aluminum chloride | 13 |

The reaction product was examined by GLPC and was found to contain compounds with the same residence time as those compounds that result when alpha-olefins are used to alkylate benzene. The product was compared to octyl, decyl, and dodecyl benzene products. Infrared confirmed the presence of alkyl benzenes, but the yield was impossible to determine due to the great number of products and unreacted alcohols resulting from hydrolysis.

*Example 5*

The same charge and equipment was used as outlined in Example No. 2. The addition of the AlCl₃ was made at 20–25° C. instead of 3–7° C. Immediately after the addition, the reaction mixture was heated to reflux with stirring for 3 hours. This reaction mixture was then poured on cracked ice, and the benzene layers were removed and dried with anhydrous calcium sulfate. The yield of the monopropylbenzene (boiling point, 130 to 170) was 44 percent. The yield of the dipropylbenzene (B.P. 170–220) was 7.2 percent.

*Example 6*

The same procedure was used as outlined in Example No. 5, except that the addition temperature was 70–80° C. (addition of AlCl₃). The yield of the monopropylbenzene was 47 percent. Yield of the dipropyl was 2.5 percent.

*Example 7*

The same procedure was used as outlined in Example No. 2, except that the reaction mixture was stirred at 3–7° C. for one hour, then at room temperature for 5 hours. The yield of monopropylbenzene was 77 percent, and dipropylbenzene was 5 percent.

Having thus described the invention by providing specific examples thereof, it is to be understood that no undue limitations or restrictions are to be drawn by reason thereof and that many variations and modifications are within the scope of the invention.

I claim:

1. A process for the alkylation of aromatic compounds which comprises conducting an alkylation reaction in a system consisting essentially of an alkylatable aromatic compound and as an alkylating agent an aluminum alkoxide, in the presence of an alkylation catalyst under alkylation reaction conditions, hydrolyzing, and recovering alkylated aromatic compound.

2. A process for the alkylation of aromatic compounds which comprises conducting an alkylation reaction in a system consisting essentially of an alkylatable aromatic compound and as an alkylating agent an aluminum alkoxide, in the presence of a Friedel-Crafts alkylation catalyst at a temperature in the range of between about −25 and 200° C., hydrolyzing, and recovering alkylated aromatic compound.

3. The process of claim 2 in which the alkylatable aromatic compound is an aromatic hydrocarbon.

4. The process of claim 3 in which the alkylatable aromatic compound is benzene.

5. A process for the alkylation of an aromatic compound which comprises conducting an alkylation reaction in a system consisting essentially of an alkylatable aromatic compound and as an alkylating agent aluminum alkoxides in which the alkoxy groups contain from about 2 to about 30 carbon atoms, said aluminum alkoxides being prepared by reacting a low molecular weight aluminum alkyl with a low molecular weight mono-1-olefin to form an aluminum alkyl growth product having the formula

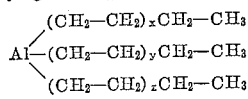

wherein $x$, $y$, and $z$ represent integers ranging from 0 to about 14, oxidizing said growth product to the alkoxides, in the presence of an alkylation catalyst under alkylation reaction conditions, hydrolyzing and recovering alkylated aromatic hydrocarbon.

6. The process of claim 5 in which the alkylatable aromatic compound is an aromatic hydrocarbon.

7. The process of claim 5 in which the alkylatable aromatic compound is benzene and the catalyst is aluminum chloride.

8. A process for the alkylation of benzene which comprises conducting an alkylation reaction in a system consisting essentially of benzene and as an alkylating agent an aluminum alkoxide, in the presence of a Friedel-Crafts alkylation catalyst at a temperature between about 0 and about 100° C. for between about 1 and 10 hours, hydrolyzing, and recovering alkylbenzene product.

9. The process of claim 8 in which the Friedel-Crafts catalyst is aluminum chloride and the aluminum alkoxide is aluminum isopropoxide.

10. The process of claim 8 in which the Friedel-Crafts catalyst is boron trifluoride and the aluminum alkoxide is aluminum isopropoxide.

11. The process of claim 8 in which the Friedel-Crafts catalyst is aluminum chloride and the aluminum alkoxide is aluminum isobutoxide.

12. The process of claim 8 in which the Friedel-Crafts catalyst is aluminum chloride and the aluminum alkoxide is a mixture of compounds in which the alkoxy groups contain from about 2 to about 30 carbon atoms, said alkoxides being prepared reacting a low molecular weight aluminum alkyl with a low molecular weight mono-1-olefin to form aluminum alkyl growth product having the formula

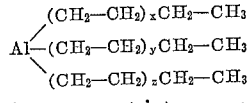

wherein $x$, $y$, and $z$ represent integers ranging from 0 to about 14, and thereafter oxidizing said growth product to the alkoxides.

---

[1] The product of the growth reaction follows a statistical distribution known as the Poisson distribution. Mathematically, this may be expressed as follows:

$$(moles)_{naf}\ (n) = \frac{e^{-m}m^n}{n!}$$

where:
(moles)$_n$ = number of moles having $n$ additions of ethylene
$n$ = number of additions of ethylene to an Al—C—C group
$m$ = mean number of additions of ethylene References Cited in the file of this patent

UNITED STATES PATENTS

| 2,244,512 | Brandt | June 3, 1941 |
| 2,440,750 | Kraus et al. | May 4, 1948 |